INVENTOR.
SEYMOUR ZELNICK
BY
ATTORNEY

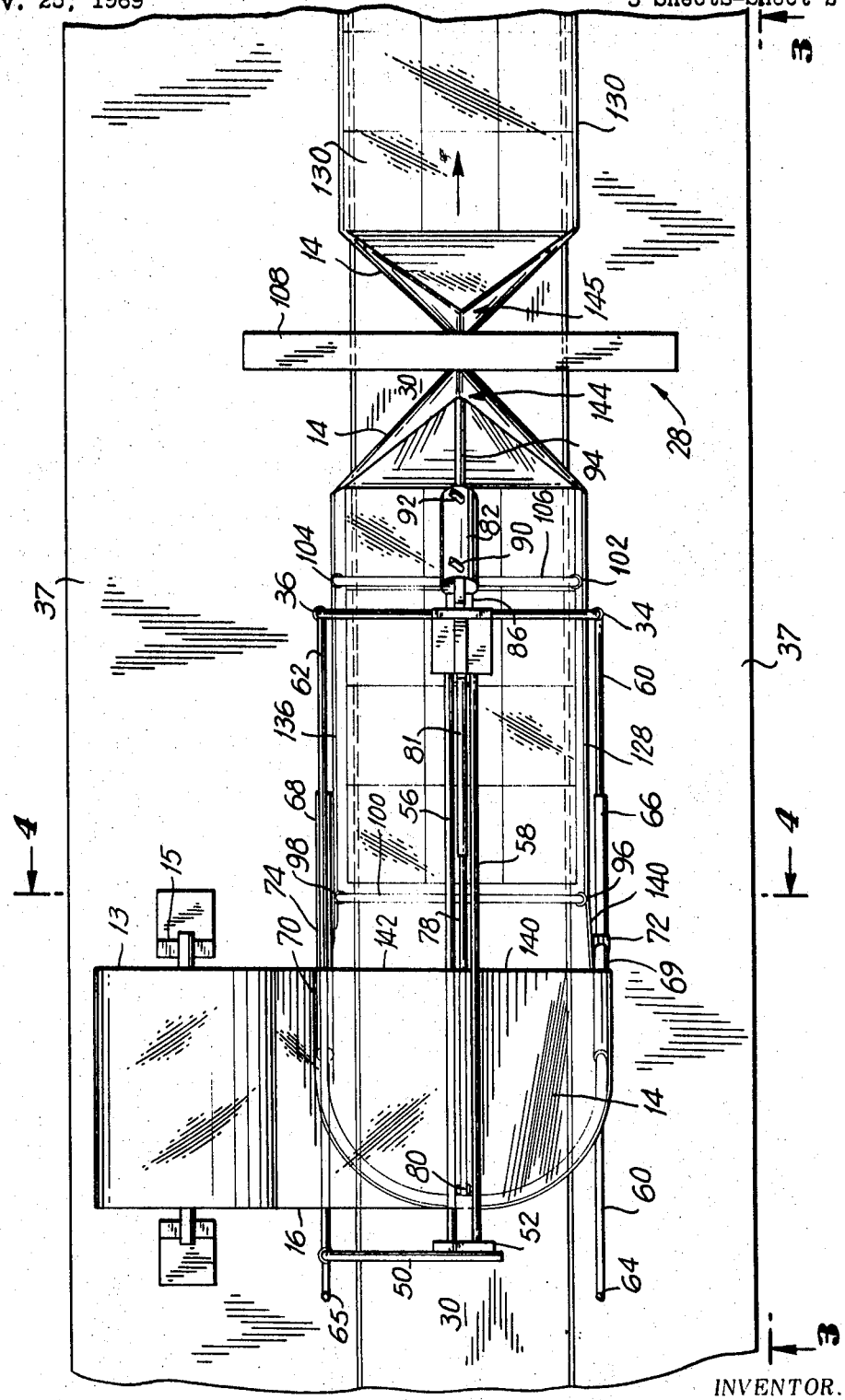

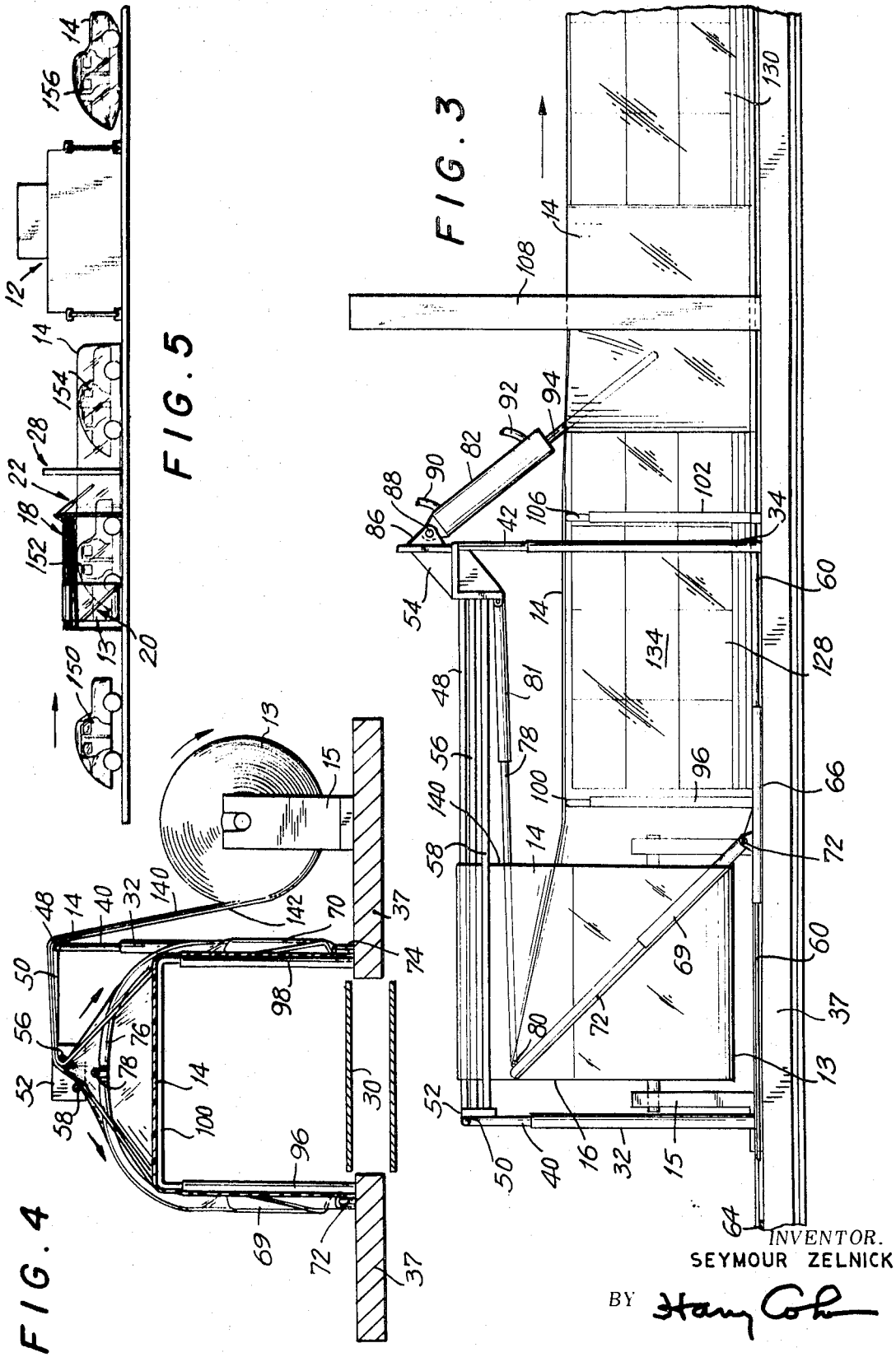

3,619,970
AUTOMATIC METHOD AND APPARATUS FOR
THE WRAPPING OF ARTICLES
Seymour Zelnick, Orange, N.J., assignor to
Weldotron Corporation, Newark, N.J.
Filed Nov. 25, 1969, Ser. No. 879,738
Int. Cl. B65b 11/08, 49/04, 43/06
U.S. Cl. 53—30                                    16 Claims

ABSTRACT OF THE DISCLOSURE

New and improved, automatic method and apparatus for the wrapping of articles in wrapping materials from a single center folded supply of the latter are provided and are effective to wrap said articles by the covering of the respective side, end and top surfaces thereof. The apparatus comprise means to withdraw the wrapping material from said supply and form an inverted, generally U shaped tube thereof, means to move articles into said tube and to advance said articles and said tube, and means to cut and seal said tube adjacent the respective leading and trailing end surfaces of the articles to complete the wrapping thereof. Gusset forming means are provided and are operable concomitantly with said cutting and sealing means to form gusset in said wrapping material tube attendant the cutting and sealing thereof to neatly control any excess wrapping material produced by said cutting and sealing and provide for the convenient containment of article identifying labels or the like in the article wrapping.

BACKGROUND OF THE INVENTION

(1) Field of the invention

This invention relates to new and improved method and apparatus for the automatic wrapping of articles in a suitable wrapping material and, more particularly, to such method and apparatus whereby each of the respective end, side and top surfaces of said articles are substantially covered by said wrapping material.

(2) Description of the prior art

Although methods and apparatus are known in the prior art for the automatic wrapping of articles in wrapping materials in the nature of thermoplastic film materials to be followed by the shrinking of such wrapping materials in suitable shrink tunnel means, it may be understood that the methods and apparatus of the prior art which accomplish this article wrapping in such manner as to include the wrapping of the top surface of the article, as well as the respective end and side surfaces thereof, will generally be found to be relatively complex and costly, and to require the supply of the thermoplastic film wrapping materials from two or more supply rolls thereof. More specifically, in one such apparatus which is believed representative of those of the prior art wherein the thermoplastic film material is wrapped around the top surface, as well as the respective side and end surfaces, of the article, it may be understood that a generally vertical sleeve of said film material is formed and utilized to wrap the respective article side and end surfaces, while a separate sheet of said thermoplastic film material, from a separate supply roll thereof, is required to cover the top surface of the article to result in relatively complex wrapping apparatus of relatively high cost. The advantages of covering the top surface, as well as the side and end surfaces, of the article to be wrapped are believed obvious to those skilled in this art and may be understood to be of particular significance, for example, in instances wherein the articles to be wrapped are constituted by newly manufactured automobiles, the finish of which, including, of course, the top or the hood and roof surfaces of the automobile, may advantageously be protected by suitable thermoplastic film wrapping materials during the shipping and storage of such automobiles.

OBJECTS OF THE INVENTION

It is, accordingly, a primary object of this invention to provide new and improved, automatic method and apparatus for the wrapping of articles in suitable wrapping materials wherein each of the respective side, end and top surfaces of said articles are covered by said wrapping materials.

Another object of this invention is the provision of method and apparatus as above which require the use of only a single roll of folded wrapping material to accomplish the article wrapping function.

Another object of this invention is the provision of method and apparatus as above which are automatically operable at relatively high speed to automatically and and successively wrap a series of articles.

Another object of this invention is the provision of apparatus as above including features enabling ready and convenient adjustment in the operational height of the apparatus to thereby enable the wrapping thereby of articles of varying height to provide for significant apparatus versatility.

Another object of this invention is the provision of apparatus as above which are of relatively simple form, and require the use of only readily available components of proven dependability and relatively low cost to thus provide for rleatively low apparatus fabrication cost and insure long periods of satisfactory, maintenance free operation thereof.

A further object of this invention is the provision of method and apparatus as above which are particularly adaptable for use in conjunction with suitable shrink tunnel means for the shrink wrapping of series of articles in the nature of palletized loads or newly manufactured automobiles in suitable, thermoplastic film material wrappings.

SUMMARY OF THE INVENTION

As disclosed herein in the form of a currently preferred embodiment thereof, the new and improved, automatic wrapping apparatus of my invention is operable to automatically wrap articles which are supplied thereto in series, and may be understood to comprise generally series-disposed operatively associated reverse film folding plow means, vertical film sleeve-wrap means, film gusset forming means, and film cutting and sealing jaw means, respectively. Conveyor means are provided and are intermittently operable to convey articles to be wrapped through first and second positions thereof relative to said apparatus. A single supply roll of center-folded wrapping material in the nature of a suitable thermoplastic film material is mounted adjacent said conveyor means with the axis of said supply roll being generally parallel to said conveyor means, and the opening in said center-folded film material facing in the direction of movement of the said conveyor means.

In operation, the thermoplastic film material is pulled off of said supply roll by the movement of a previously wrapped article on said conveyor means from said first position thereof to said second position thereof, and said center folded film material is separated by said film sleeve-wrap means and folded by said reverse film folding plow means so as to form an inverted, generally U-shaped tube of film above and generally parallel to said conveyor means, with the dimensions of the film tube being generally commensurate with the dimension of the articles to be wrapped. The concomitant movement of a succeeding article into said first position thereof by said conveyor means will function to dispose said article substantially within the thusly formed film material tube.

As said succeeding article assumes said first position, the conveyor means are momentarily de-energized and said cutting and sealing jaw means and said gusset forming means are concomitantly operated to sever the film tube ahead of said succeeding article and form a generally vertically extending seal therein, and to form a gusset in the film to thus control the excess film produced by operation of said cutting and sealing jaw means in a neat and consistent manner and automatically provide a container in the nature of an open-topped envelope in the film wrap for the insertion of article indicia or the like therein. Following this, the conveyor means are momentarily re-energized to move the article under discussion through said cutting and sealing jaw means, which are now re-opened, to a said second position thereof to pull said film tube forward through the now opened cutting and sealing jaw means, while the next succeeding article is moved into said first position through said film tube, and said conveyor means again momentarily de-energized. The cutting and sealing jaw means and gusset forming means are again operated as described to concomitantly cut and seal said film tube at both the trailing end of the article under discussion, and the leading end of said next succeeding article, to thus complete the film wrapping of the former. Following this, the thusly wrapped article may be conveyed by the next re-energization of the conveyor means into suitable shrink tunnel means for the tight shrinking of the thusly applied film wrapping therearound in conventional manner. Operation of the apparatus is continuous as described to effect the automatic wrapping of a series of articles.

DESCRIPTION OF THE DRAWINGS

The above and other objects and significant advantages of my invention are believed made clear by the following detailed description thereof taken in conjunction with the accompanying drawings wherein:

FIG. 2 is a top elevational view of the apparatus of FIG. 1;

FIG. 3 is a side elevational view of the apparatus of FIG. 1 taken in the direction indicated by the arrows 3—3 in FIG. 2;

FIG. 4 is a cross sectional view of the wrapping material folding means portion of the apparatus of FIG. 1 taken along line 4—4 in FIG. 2; and FIG. 5 is a side elevational view of new and improved wrapping apparatus constructed and operative in accordance with the teachings of my invention and depicted in operative relationship with suitable shrink tunnel means for the shrink wrapping of a series of automobiles.

DETAILED DESCRIPTION OF THE INVENTION

Figure 1:
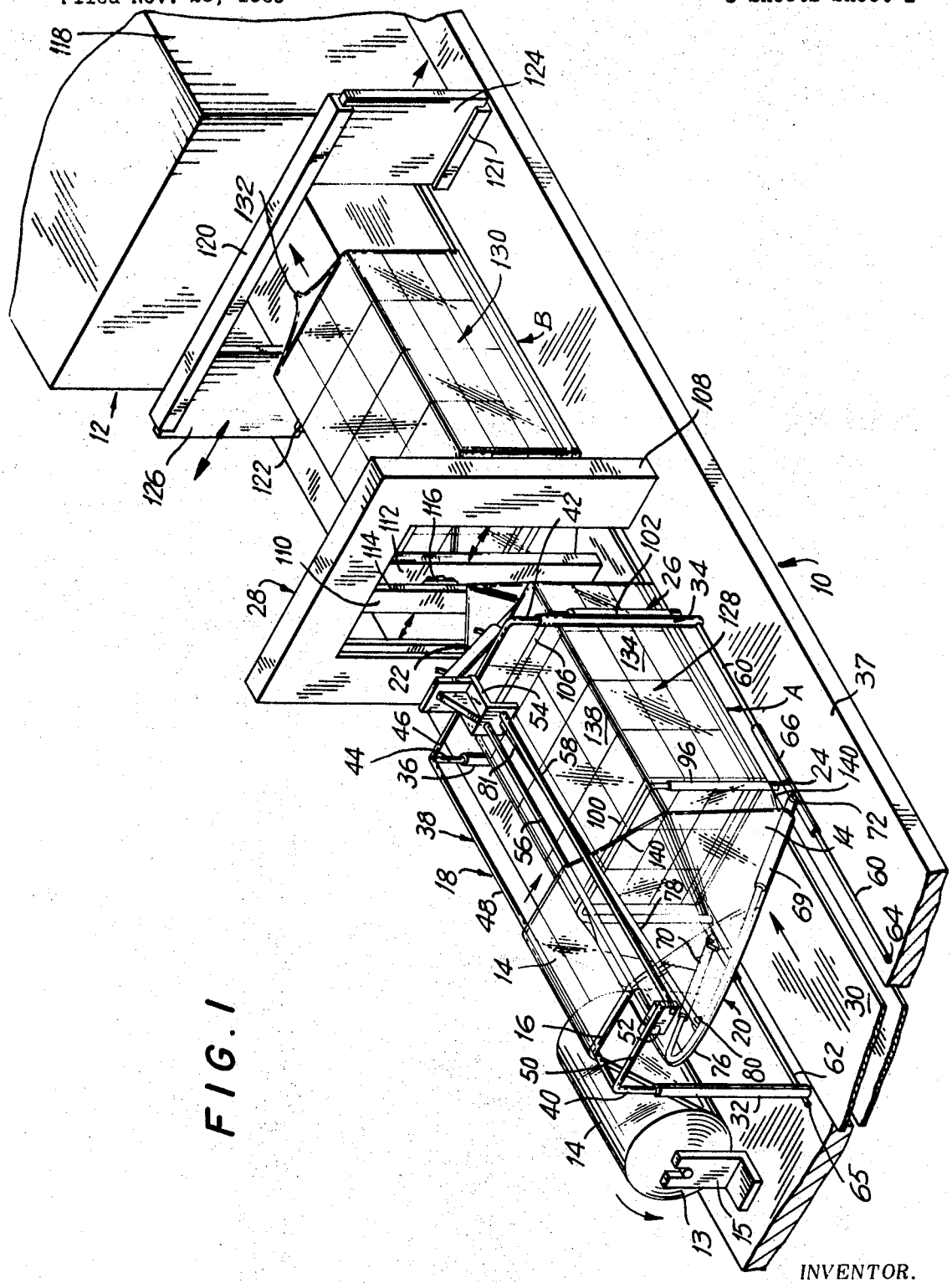
FIG. 1 is a perspective view of new and improved, automatic wrapping apparatus constructed and operative in accordance with the teachings of my invention and depicted in operative relationship with suitable shrink tunnel means for the shrink wrapping of a series of palletized loads.

Referring now to FIGS. 1 through 4, new and improved, automatic wrapping apparatus constructed and operative in accordance with the teachings of my invention are indicated generally at 10, and are disposed as shown in operative relationship with suitable shrink tunnel means as indicated in partially cut-away form at 12.

The apparatus 10 comprise a supply roll 13 of any suitable center folded thermoplastic, heat shrinkable film material 14 in the nature, for example, of polyethylene or polyvinyl chloride, which is supported for rotation as shown from support means 15 and in center folded as indicated along a fold line 16. Further included are vertical film sleeve-wrap means as indicated generally at 18, reverse film folding plow means as indicated generally at 20, film gusset forming means as indicated generally at 22, film tube forming and support means as indicated generally at 24 and 26, film cutting and sealing means as indicated generally at 28, and infeed conveyor means 30, respectively disposed and arranged as shown.

The vertical film sleeve-wrap means 18 comprise spaced, generally tubular support posts as indicated at 32, 34 and 36, which extend as shown from the support surface 37, and a frame as generally indicated at 38 is supported therefrom, in readily vertically adjustable manner, through the projection as shown of the respective frame support legs 40, 42 and 44 in telescoping manner into said generally tubular support posts. A support arm 46 extends as shown to connect frame legs 42 and 44, while roller means 48 which may take any suitable form are provided to extend as shown to connect frame legs 40 and 44. Further included in the frame 38 is a support arm 50 which extends as shown from the frame leg 40 midway across the support frame generally transversely of the conveyor means 30.

A generally rectangular mounting plate 52 is disposed as shown adjacent the extremity of the support arm 50 and may be understood to be affixed thereto in any convenient manner, as by welding. A mounting plate assembly 54 is affixed in like manner to the frame support arm 46 generally intermediate thereof, whereby it may be understood that the respective mounting plate 52 and mounting plate assembly 54 would be in substantial longitudinal alignment. Spaced rollers 56 and 58 which may again take any suitable form are supported from the respective mounting plate 52 and mounting plate assembly 54 and may be understood to extend therebetween in the depicted substantially longitudinal manners to complete the support frame 38.

Referring now to the reverse film folding plow 20, the same may be seen in FIGS. 1 through 4 to comprise generally horizontally extending guide rods 60 and 62 which respectively extend as best seen in FIGS. 1, 2 and 3 from points of attachment to the support posts 34 and 36 to attachment means as indicated at 64 and 65 which attach said guide rods to the support surface 37 to thus substantially fix the position of said guide rods relative to said support surface. Generally tubular support arms 66 and 68 are respectively telescopically disposed over said guide rods so as to be readily slidable over the latter and thus movable generally longitudinally thereof. Generally tubular support arms are further indicated at 69 and 70 and are respectively pivotally attached as shown to the support arms 66 and 68 through the use of readily adjustable pivotal attachment means as indicated at 72 and 74.

A curved plow member is indicated at 76 and may be understood to take the form of a rod which is bent as described in detail hereinbelow to assume the depicted generally U shape thereof. The extremities of the plow member 76 are respectively telescoped as shown into the generally tubular support arms 69 and 70, and a plow support rod 78 is pivotally attached to the plow member 76 generally intermediate thereof through the use of readily adjustable pivotal attachment means as indicated at 80. The plow support rod 80 extends as shown into telescoping relationship with a generally tubular support arm 81 which is in turn attached at the remote extremity thereof to the mounting plate assembly 54, to support the plow member 76 in part from said mounting plate assembly. As a result of the longitudinally adjustable positioning of the respective generally tubular support arms 66 and 68 on the respective guide rod 60 and 62, the pivotally adjustable attachment of the respective generally tubular support arms 69 and 70 to the support arms 66 and 68, the telescopic mounting of the respective curved plow member end portions in the respective generally tubular support arms 69 and 70, and the generally longitudinally adjustable attachment of the plow member support rod 78 to the mounting plate assembly 54, it is believed made clear that ready and convenient adjustment in the longitudinal and vertical disposition of the curved plow member 76, and in the angle of inclination thereof and of the support arms 69 and 70 relative to the conveyor means 30, may be effected as desired to significant advantage as described in detail hereinbelow.

Referring now to the film gusset forming means 22, the same may be seen to comprise a double acting, fluid actuated cylinder 82 which is pivotally mounted as shown from the mounting plate assembly 54 through use of a mounting bracket 86 and a pivot pin 88. Pressurized fluid supply conduits are indicated at 90 and 92, and may be understood to extend from any non-illustrated source of a suitable pressurized fluid in the nature of compressed air for the supply thereof to the double acting cylinder 82 for operation of the latter in conventional manner. A film gusset forming pusher rod is indicated at 94 and may be understood to be formed by the extension of the piston rod of the double acting fluid cylinder 82. As a result, it is believed clear that the supply of pressurized fluid on conduit 90 to the double acting fluid cylinder 82 will be effective to move the pusher rod 94 to the extended position thereof as seen in FIGS. 1, 2 and 3, while the supply of pressurized fluid on conduit 92 to said double acting fluid cylinder will be effective to retract said pusher rod.

The film tube forming and support means 24 comprise aligned, generally tubular support posts 96 and 98 which are spaced as shown adjacent opposite sides of the conveyor means 30 and extend generally vertically of the support surface 37. A generally U shaped film tube forming and support member 100 extends as shown between the said support posts with the respective extremities of said member being disposed in telescopic manner within said support posts to thus enable the ready and convenient adjustment as desired in the height of the member 100 as should be obvious. In like manner, the film tube forming and support means 26 may be seen to comprise spaced, generally tubular support posts 102 and 104, and a generally U shaped film tube forming and support member 106 extending therebetween with the respective extremities of said member being disposed in telescopic manner in said support posts to again enable ready and convenient adjustment in the height of the member 106 as desired.

The film cutting and sealing means 28 are of generally conventional construction and comprise a generally U shaped support frame or housing 108, and a pair of opposed, generally vertically oriented cutting and sealing jaws 110 and 112 operatively mounted therein for slidable movement toward or away from each other as indicated by the directional arrows in FIG. 1. The cutting and sealing jaws 110 and 112 respectively comprise cutting and sealing means, as indicated at 114 and 116, operatively disposed as shown in opposed edges thereof. Each of said cutting and sealing means may take any conventional form in the nature, for example, of high resistance electrically conductive means which are suitably energized for heating from any convenient, non-illustrated source of appropriate electrical energy, and said cutting and sealing means may be understood to be effective upon the closing of the cutting and sealing jaws 110 and 112 to press the thermoplastic film material 14 firmly therebetween, to cut and seal said thermoplastic film material along a generally vertical line in manner believed well-known by those skilled in this art. Suitable, non-illustrated sealing jaw drive means are of course provided to operate the respective sealing jaws 110 and 112 as described and may be understood, for example, to take the form of an electrical drive motor operatively associated therewith, again in manner well-known to those skilled in this art.

Although the shrink tunnel 12 does not, per se, form any part of this invention, the same way be understood to preferably take the form of that shown and described in co-pending application for United States patent of Mr. Kelvin G. Anderson and myself entitled "New and Improved Shrink Tunnel," Ser. No. 814,934, filed Apr. 10, 1969 and assigned to the assignee hereof. As such, the thrink tunnel 12 may be understood to comprise a housing or tunnel forming structure 118 through which heated air is circulated concomitantly with disposition therein of a thermoplastic film-wrapped article to shrink said thermoplastic film tightly around said article in manner believed well-known to those skilled in the art. For use with the new and improved, automatic wrapping apparatus of this invention, the shrink tunnel means 12 will preferably comprise entrance doors and exit doors to enable the movement of a thermoplastic film wrapped article thereinto upon opening of said entrance doors attendant appropriate operation of the conveyor means 30, the heat shrinking of thermoplastic film wrapping tightly around said article through the closing of said entrance doors and momentary discontinuation in the operation of the conveyor means 30, and the subsequent removal of the tightly heat shrunk, theremoplastic film wrapped article from the tunnel and the concomitant movement of another thermoplastic film wrapped article thereinto through the concomitant opening of said entrance and exit doors and appropriate operation of the conveyor means 30, as should be obvious.

The entrance doors, only, of the shrink tunnel means 12 are illustrated and may be seen to comprise generally transversely extending door mounting and guide means 120 and 122, and tunnel entrance doors 124 and 126 mounted therefrom for slidable movement relative thereto toward and away from each other in the manner indicated by the arrows in FIG. 1. In operation, the respective tunnel doors 124 and 126 are moved, under the control of suitable, non-illustrated door operating means which may, for example, take the form of suitable electrical drive motor means, toward each other to close said doors and away from each other to open said doors, as again should be obvious.

OPERATION

In operation, for example, in the automatic thermoplastic film wrapping of the respective end, side and top surfaces of a series of loads of material in the nature of palletized material loads as indicated at 128 and 130, and referred to as "Pallet-Paks" by applicant's assignee, the Weldotron Corporation of Newark, N.J., it may be understood that the respective heights of the vertical film sleeve-wrap means 18, and the film tube forming and support means 24 and 26, will be adjusted, if necessary, to be commensurate with the height of said palletized loads. In addition, the overall height and angle of inclination of the curved plow member 76 of the reverse film folding plow means 20 is adjusted, if necessary to be commensurate with the height of said palletized loads and to provide for an angle of inclination of said plow member of approximately 45° relative to the top surfaces of said palletized loads, it being understood that the generally rounded shape of said plow member taken in conjunction with this approximately 45° angle of inclination has been determined to minimize film drag and film wrinkling or distortion upon movement of the thermoplastic film 14 thereover as described in detail hereinbelow to thus greatly facilitate such film movement and insure the substantial smoothness of the film.

The height of the film gusset forming means 22 will, of course, be automatically adjusted by the adjustment, if necessary, of the height of the vertical film sleeve-wrap means 18 since the former are mounted from the latter through mounting plate assembly 54. The angle of inclination of the gusset forming pusher rod 94 is, however, of additional importance, and it may be understood that this angle of inclination may be readily adjusted, if necessary, through adjustment in the pivotal mounting means 86 and 88 to insure that the said angle is approximately 45°, it being understood that an approximately 45° angle of inclination for the gusset forming pusher rod 94 has been determined to insure that there will be substantially no relative movement between the generally rounded tip of said rod and the thermoplastic film material 14 during apparatus operation to thus minimize the chances of the tearing of said thermoplastic film material by said rod tip.

For use of the new and improved, automatic wrapping apparatus of my invention as disclosed herein in conjunction with suitable shrink tunnel means for the automatic shrink wrapping of a series of palletized loads, it may be understood that conveyor means 30 will be arranged to operate, under the control of non-illustrated palletized load detector and control means, to intermittently move each of said palletized loads in succession to each of a first position thereof as indicated generally at A in FIG. 1 wherein said palletized load is operatively disposed in large measure within the vertical film sleeve-wrap means 18, a second position thereof as indicated at B in FIG. 1 wherein said palletized load is disposed intermediate the cutting and sealing jaw means 28 and the shrink tunnel means 12, and a third position thereof wherein said palletized load is operatively disposed within said shrink tunnel means.

Considering now specifically the operation of the film wrapping apparatus 10 of the invention, and assuming normal operating conditions to have been reached, it may be understood that as the palletized load 130 is moved by the conveyor means 30 from the first position as indicated at A to the second position thereof as indicated at B, the same would function by virtue of the generally vertical seal 132 formed in the thermoplastic film wrapping material 14 at the leading end surface thereof by operation of the sealing jaws 110 and 112 to pull said film material therewith through the said apparatus and effect the substantial wrapping of said film material, by the formation of an inverted, generally U shaped tube thereof, around the respective side and top surfaces 134, 136 and 138 of the palletized load 128 which is, of course, movable in synchronism with the palletized load 130 into by operation of the first position of the former conveyor means 30. More specifically, as the center folded film material 14 is unwound from the supply roll 13 thereof under this pulling action of the palletized load 130, the leading or doubled edges 140 and 142 of said film material will be divided by the passage thereof over frame roller 56 with the upper film material edge 140 passing therefrom as shown under frame roller 58 and over the reverse folding plow support post 69 to pass partially around and under the latter and to pass therefrom over the respective support post 96 and 102 of the respective film tube forming and support means 24 and 26 to thus effect the substantial covering of the side surface 134 of the palletized load 128. Concomitantly, the lower edge 142 of these doubled leading edges of the center folded film material 14 will be drawn partially around and under the roller 56 to pass therefrom partially around and under the reverse film folding plow support post 70, and to pass from the latter as shown outside of the respective support posts 98 and 104 of the film tube forming and support means 24 and 26 to thus substantially cover the side surface 136 of the palletized load 128. As this disposition of the respective film material leading edges 140 and 142 is occuring, it may be understood that the folded or trailing edge of the center folded film material 14 which constitutes the fold line 15 will be drawn partially around the roller 56, and drawn therefrom as shown around the curved plow member 76 of the reverse folding plow 20 to thus effect the opening of said film material around said plow member with subsequent flow of said material over the respective generally U shaped film tube support members 100 and 106 of the film tube forming and support means 24 and 34 to thus provide for the covering of the top surface 138 of the palletized load 128. As a result of this conjunctive operation of the vertical film sleeve-wrap means 18 and the reverse film folding plow means 20, it is believed made clear that the center folded film material 14 will be drawn from the film material supply roll 13 and automatically formed into an inverted, generally U shaped tube to wrap around the palletized load 128 in such manner as to cover the respective side and top surfaces 134, 136 and 138 of the latter in one smooth operation.

Just as the respective palletized loads 128 and 130 have been moved into the respective first and second positions thereof as indicated at A and B in FIG. 1, it may be understood that operation of the conveyor means 30 will be momentarily halted, as through the use of said non-illustrated detector means which may be operative to detect the fact that the trailing end surface of the palletized load 130 has cleared the cutting and sealing jaw means 28, whereupon said sealing jaw means will be activated to commence the movement of the respective cutting and sealing jaws 110 and 112 from the "open" position thereof to the "closed" position thereof.

This operation of the sealing jaw means 28 will, of course, be effective to sever the tube of the thermoplastic film material 14 and to simultaneously form suitable, generally vertically extending film material seals, in the nature of that shown at 132, at the trailing end surface of the palletized load 130 and at the leading end surface of the palletized load 128, respectively.

Concomitantly, operation of the gusset forming means 22 will be effected through the supply of pressurized fluid to double acting fluid cylinder 82 through pressurized fluid supply conduit 90, to move the gusset forming rod 94 from the retracted position thereof to the illustrated extended position thereof to form neat gussets as indicated generally at 144 and 145 in FIG. 2 at the respective trailing end surface and leading end surface of the palletized loads 130 and 128, to thus control in neat and consistent manner the excess film material which is automatically produced by the closing of the cutting and sealing jaws 110 and 112. In addition to providing for the neat and protective disposition of the excess film material 14 formed by the operation as described of the cutting and sealing jaw means 28, it may be understood that the provision of the gussets 144 and 145 by the operation as described of the gusset forming means 22 provides a convenient location for the disposition of palletized load indicia or related materials in the nature of an identifying or shipping label, and/or packing slip, to thus render unnecessary the attachment of such labels or the like to the film-wrapped palletized load as might be rendered difficult by the relatively low friction characteristic of said film material. More specifically, it is believed clear that such identifying labels or the like may be conveniently inserted, either manually or automatically, into said gussets prior to the shrinking of the film material in the shrink tunnel 12.

The operation as described of the cutting and sealing jaw means 28 will be followed by the opening thereof and retraction of the gusset forming pusher rod 94, and the concomitant opening of the entrance doors 124 and 126 of the shrink tunnel means 12 whereupon the conveyor means 30 will be re-energized to move the palletized load 130 into said third position thereof within said shrink tunnel means, to move palletized load 128 to the second position thereof as indicated at B, and to move the non-illustrated palletized load which follows palletized load 128 into the first position thereof as indicated at A. Following this, the shrink tunnel entrance doors 124 and 126 will be closed and the shrink tunnel means 12 operated to tightly shrink the film wrapping material 14 around the respective top, side and end surfaces of the palletized load 130 to complete the shrink wrapping thereof, while the respective cutting and sealing jaws 110 and 112 of the cutting and sealing jaw means 28, and the gusset forming pusher rod 94 of the gusset forming means 22 will be concomitantly operated to form the desired seals and gussets as described at the trailing end surface of the palletized load 128 and at the leading end surface of said non-illustrated following palletized load.

Operation as described of the apparatus of the invention is, of course, automatically continuous with each of the palletized loads being moved in turn to the first position thereof for the wrapping of the thermoplastic film material 14 around the respective side and top surfaces thereof through operation of the vertical film sleeve-wrap meais 18 and the reverse film folding plow means 20, and the subsequent cutting of said film material and formation of the generally vertical seal and gusset at the leading end surface of said palletized load through the operation of the cutting and sealing jaw means 28 and the gusset forming means 22, the subsequent movement of said palletized load to the second position thereof for the cutting of said film material and forming of the generally vertical seal and gusset at the trailing end surface thereof through the next operation of the cutting and sealing jaw means 28 and the gusset forming means 22, and the subsequent movement of the thusly wrapped palletized load to and through the third position thereof within the shrink tunnel means 12 to effect the tight shrinking of the thusly wrapped film material around said palletized load to complete the automatic shrink wrapping thereof.

Prior to the commencement of the automatic wrapping operation as described of the apparatus of the invention, it may be understood that the thermoplastic film material 14 would be manually withdrawn from the film supply roll 13 and manually threaded as described through the respective vertical sleeve-wrap means 18 and over the reverse folding plow means 20 to form the film material tube, and that the latter would be manually drawn through the cutting and sealing jaw means 28 whereby operation of the latter to form a seal at the leading end surface of the first palletized load to be wrapped will be effective to enable the commencement of the automatic operation of the apparatus upon energization of the conveyor means 30 as should be obvious.

Although disclosed hereinabove by way of example as applied to the shrink wrapping of palletized loads, it may be understood that the apparatus of the invention is by no means limited thereto, but rather, is equally applicable to the shrink wrapping of loads which may comprise a group of articles which are not mounted on a pallet, or a single article which is or is not mounted on a pallet. More specifically, and referring now to FIG. 5, it may be seen that the apparatus of the invention is equally well suited to the automatic wrapping for subsequent shrink wrapping of a series of articles in the nature of automobiles as indicated at 150, 152, 154 and 156 which may be conveyed thereto through operation of a conveyor in the nature of conveyor means 30. A particular advantage of the application of the apparatus of the invention to the wrapping of automobiles is the fact that, through the provision of a suitable film wrapping which substantially covers all but the undersurface of the automobile, the relatively large sums of money currently expended as discussed hereinabove by automobile dealers for the simple refurbishing and restoring of the finish of new automobiles to correct for damage done thereto through the exposure of said finish to the elements in automobile shipping and storage, and/or scratching or other marring thereof during such shipping and storage, may be saved. Too, and although disclosed hereinabove by way of example as for use in conjunction with shrink tunnel means to complete the shrink wrapping of articles, it is to be understood that the new and improved, automatic wrapping apparatus of my invention may, of course, be utilized independently thereof and/or utilized in conjunction with other forms of thermoplastic film shrinking means in the nature of manually operable hot air generation gun means or the like.

While there have been shown and described preferred embodiments of the invention, it will be understood that the invention may be embodied otherwise than as herein specifically illustrated or described, and that in the illustrated embodiments certain changes in the details of construction and in the form and arrangement of the parts may be made without departing from the underlying idea and principles of this invention within the scope of the appended claims.

I claim:

1. In a method of wrapping an article having respective generally side, end and top surfaces in a wrapping material, the steps of, providing a supply of said wrapping material which is folded along a generally longitudinal fold line, withdrawing said folded wrapping material from said supply, opening said material along said fold line to form an inverted, generally U shaped tube thereof of dimensions which are generally commensurate with the dimensions of said article, moving said article into said tube, cutting and sealing said wrapping material tube adjacent the leading end surface of said article to form a seal, advancing said article to further form and advance said wrapping material tube, and cutting and sealing said wrapping material tube adjacent the trailing end surface of said article to form a seal to complete the wrapping of the article and effect the covering of said respective article end, side and top surfaces.

2. In a method of wrapping an article having respective generally side, end and top surfaces in a wrapping material, the steps of, providing a supply of said wrapping material which is center folded along a generally longitudinal fold line, withdrawing said center folded wrapping material from said supply, opening said material along said fold line to form an inverted, generally U shaped tube thereof of dimensions which are generally commensurate with the dimensions of said article, moving said article into said tube, cutting and sealing said wrapping material tube adjacent the leading end surface of said article to form a seal, advancing said article to further form and advance said wrapping material tube while concomitantly moving a succeeding article into said tube and maintaining said succeeding article spaced from said article, cutting and sealing said wrapping material tube between said article and said succeeding article to respectively form seals adjacent the trailing end surface of said article and the leading end surface of said succeeding article to complete the wrapping of the article and effect the covering of the respective article end, side and top surfaces, advancing said succeeding article to further form and advance said wrapping material tube while concomitantly moving a next succeeding article into said tube and maintaining said next succeeding article spaced from said succeeding article, cutting and sealing said wrapping material tube between said succeeding article and said next succeeding article to respectively form seals adjacent the trailing end surface of said succeeding article and said next succeeding article to complete the wrapping of said succeeding article and effect the covering of the respective succeeding article end, side and top surfaces.

3. In a method as in claim 1 wherein said wrapping material is constituted by a thermoplastic film material, and said method further comprises, the step of, heat shrinking said thermoplastic film material around said article following the completion of the wrapping of the latter.

4. In apparatus for wrapping an article having respective generally side, end and top surfaces, a supply of a wrapping material which is center folded along a generally longitudinal fold line, means to form an inverted, generally U-shaped tube of said wrapping material around said article attendant the withdrawal of said wrapping material from said supply, said wrapping material tube having dimnesions which are generally commensurate with the dimensions of said article, cutting and sealing means to cut and seal said wrapping material tube adjacent the leading end surface of said article to form a seal, means to advance said article relative to said cutting and sealing means to further form and advance said wrapping material tube and enable the cutting and sealing of said wrapping material tube by said cutting and sealing means to form a seal adjacent the trailing end surface of said article, thereby completing the wrapping of the article and affecting the covering of said respective article end, side and top surfaces, said means to form an inverted, generally U-shaped tube of said wrapping material comprising, frame means for separating the doubled edges of said center folded wrapping material, and reverse folding means for opening said wrapping material along the fold line thereof and guiding said separated wrapping material edges over opposite side surfaces respectively of said article to form said wrapping material tube, said wrapping material tube forming means further comprising, generally U-shaped tube forming and support means to further form said wrapping material tube and support the latter around said article.

5. In apparatus as in claim 4 wherein, the height of said generally U-shaped tube forming and support means is adjustable relative to said article whereby articles of dicerent sizes may be accomodated thereby.

6. Apparatus as in claim 4 further comprising, gusset forming means for forming a gusset in said wrapping material tube concomitantly with the cutting and sealing thereof adjacent said leading and trailing end surfaces of said article to control in neat manner any excess wrapping material produced by said cutting and sealing thereof.

7. Apparatus as in claim 6 wherein, said gusset forming means comprise pusher rod means which are downwardly movable at a predetermined angle of inclination relative to said article to move said wrapping material therewith substantially without relative movement therebetween to inhibit tearing of said wrapping material by said pusher rod means, and form said gusset attendant the operation of said cutting and sealing means.

8. In apparatus as in claim 7 wherein, said angle of inclination of said pusher rod means is approximately 45°.

9. Apparatus as in claim 7 wherein, said means to form an inverted, generally U-shaped tube of said wrapping material comprise, frame means for separating the doubled edges of said center folded wrapping material and reverse folding means for opening said wrapping material along the fold line thereof and guiding said separated wrapping material edges over opposite side surfaces respectively of said article to form said wrapping material tube.

10. In apparatus as in claim 9 wherein, said reverse folding means comprise a generally U-shaped curved plow which is disposed at a predetermined angle of inclination relative to said article.

11. In apparatus as in claim 4 wherein, said wrapping material is constituted by a thermoplastic film material, and said apparatus further comprise, heat shrinking means to heat shrink said wrapping material around said article following the wrapping of the latter.

12. In apparatus as in claim 10 wherein, said wrapping material is constituted by a thermoplastic film material, and said apparatus further comprise, heat shrinking means to heat shrink said wrapping material around said article following the wrapping of the latter.

13. In a method as in claim 1 further comprising, the steps of, respectively forming gussets in said wrapping material tube concomitantly with the cutting and sealing thereof adjacent the leading and trailing end surfaces of said article to control in neat manner any excess wrapping material produced by said cutting and sealing thereof.

14. In a method as in claim 1 further comprising, the steps of, disposing said article on a pallet prior to the movement of said article into said tube for movement of said pallet with said article into said tube, and forming said tube so that the edges thereof terminate substantially at the edge of said pallet.

15. In a method as in claim 5 further comprising, the steps of, respectively forming gussets in said wrapping material concomitantly with the cutting and sealing thereof adjacent the leading and trailing end surfaces of said article and the leading and trailing end surfaces of said succeeding article to control in neat manner any excess wrapping material produced by said cutting and sealing thereof.

16. In a method as in claim 5 further comprising, the steps of, respectively disposing said article, said succeeding article and said next succeeding article on pallets prior to the movement of said articles into said tube for movement of said pallets with said articles into said tube, and forming said tube so that the edges thereof terminate substantially at the edges of said pallets.

References Cited

UNITED STATES PATENTS

| | | | |
|---|---|---|---|
| 2,747,346 | 5/1956 | Tigerman et al. | 53—28 |
| 3,336,727 | 8/1967 | Lattke | 53—184 UX |

THERON E. CONDON, Primary Examiner

E. F. DESMOND, Assistant Examiner

U.S. Cl. X.R.

53—33, 184, 389

Disclaimer and Dedication 3,619,970.—*Seymour Zelnick*, Orange, N.J. AUTOMATIC METHOD AND APPARATUS FOR THE WRAPPING OF ARTICLES. Patent dated Nov. 16, 1971. Disclaimer and dedication filed Apr. 24, 1974, by the assignee, *Weldotrom Corporation*.

Hereby disclaims and dedicates to the Public the entire term of said patent.

[*Official Gazette August 27, 1974.*]